United States Patent
Nair et al.

(10) Patent No.: US 12,248,694 B2
(45) Date of Patent: Mar. 11, 2025

(54) DEVICE AND METHOD FOR DATA REPLICATION IN DISAGGREGATED DISTRIBUTED STORAGE SYSTEM

(71) Applicant: SAMSUNG ELECTRONICS CO., LTD., Suwon-si (KR)

(72) Inventors: Roshan R Nair, Bengaluru (IN); Arun George, Bengaluru (IN); Dinesh Ratra, Bengaluru (IN); Parag Jain, Bengaluru (IN); Preetham Parshwanath Jain, Bengaluru (IN); Rohit Kailash Sharma, Bengaluru (IN); Shivam, Bengaluru (IN); Vishak Guddekoppa, Bengaluru (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/089,986

(22) Filed: Dec. 28, 2022

(65) Prior Publication Data
US 2023/0205445 A1 Jun. 29, 2023

(30) Foreign Application Priority Data

Dec. 28, 2021 (IN) .............................. 202141061082
Dec. 23, 2022 (IN) .............................. 202141061082

(51) Int. Cl.
G06F 12/00 (2006.01)
G06F 3/06 (2006.01)
G06F 11/10 (2006.01)
G06F 11/14 (2006.01)

(52) U.S. Cl.
CPC ............ *G06F 3/065* (2013.01); *G06F 3/0604* (2013.01); *G06F 3/067* (2013.01); *G06F 11/1092* (2013.01); *G06F 11/1451* (2013.01); *G06F 11/1464* (2013.01)

(58) Field of Classification Search
None
See application file for complete search history.

(56) References Cited

U.S. PATENT DOCUMENTS

| | | | |
|---|---|---|---|
| 11,262,918 B1* | 3/2022 | Venugopal | G06F 3/0616 |
| 2013/0111114 A1* | 5/2013 | Lee | G06F 11/3485 |
| | | | 711/E12.008 |
| 2017/0149890 A1* | 5/2017 | Shamis | H04L 67/1097 |

OTHER PUBLICATIONS

G. Wu and X. He, "Reducing SSD Read Latency via NAND Flash Program and Erase Suspension", Virginia Commonwealth University, Feb. 14, 2012, (7 pages total).

(Continued)

*Primary Examiner* — Daniel D Tsui
(74) *Attorney, Agent, or Firm* — Sughrue Mion, PLLC

(57) ABSTRACT

A method for dynamically replicating data in a disaggregated distributed storage system includes receiving, by a processor, a request from a controller to replicate data; dynamically selecting, by the processor, a storage node for replicating the data from among a plurality of storage nodes, based on one or more replication parameters associated with each storage node of the plurality of storage nodes, wherein the one or more replication parameters include at least one of a flash factor corresponding to the each storage node, and a latency between the controller and the each storage node; and providing, by the processor, information about the selected storage node to the controller for replicating the data.

21 Claims, 6 Drawing Sheets

(56) References Cited

OTHER PUBLICATIONS

K. Ha et al., "A Read-Disturb Management Technique for High-Density NAND Flash Memory", ACM 978-1-4503-2316-Jan. 13, 07, 2013, (6 pages total).

* cited by examiner

DEVICE AND METHOD FOR DATA REPLICATION IN DISAGGREGATED DISTRIBUTED STORAGE SYSTEM

CROSS-REFERENCE TO RELATED APPLICATIONS

This application claims the benefit of Indian Patent Application No. 202141061082 (PS), filed on Dec. 28, 2021, and Indian Patent Application No. 202141061082 (CS), filed on Dec. 23, 2022 in the Indian Patent Office, the disclosures of which are incorporated by reference herein in their entirety.

BACKGROUND

1. Field

The disclosure relates to distributed storage system, and more particularly to a device and method for data replication in disaggregated distributed storage systems.

2. Description of Related Art

Data replication is key redundancy technique which may be used in distributed storage systems to protect against loss of data caused by a storage node failure. Disaggregated distributed storage systems may enable efficient use of computing resources by enabling scalability and flexibility. In disaggregated distributed storage systems, data replication may be used to ensure data availability even after failure of a storage node. The replicated data may be effectively placed in storage nodes to make efficient utilization of cluster resources and to recover the replicated data after failure of a storage node storing the replicated data.

Although the disaggregated distributed storage systems may enable efficient use of computing resources for replicating data, the heterogeneous nature of storage nodes are typically not exploited for data replication. As an example, storage space and wear level of a storage node 'A' may be high when compared to another storage node 'B', but a computing power of the storage node 'A' may be significantly less than a computing power of the storage node 'B'. As such, the heterogeneous nature of storage nodes may be not considered when identifying an optimal storage node for data replication.

In addition, a dynamic nature of the storage nodes in the disaggregated distributed storage system also influences the endurance of the storage nodes. As an example, a specific storage node may be frequently used for data replication, and therefore the storage node may experience a high load and a high latency because the storage node may serve a large number of clients. Accordingly, placement of replicated data and recovery process of replicated data may lack flash awareness. This lack of flash awareness may lead to degradation of NAND devices used in the storage nodes.

Similarly, controllers serving read requests in some disaggregated distributed storage systems may not effectively utilize either the heterogeneous nature of storage nodes or the dynamic nature of the storage nodes to serve the read requests to clients. As an example, a storage node already experiencing a heavy load, for example such as a storage node serving read requests to 10 clients, may be selected to serve the replicated data to a new client, which may add to the already pending read requests associated with the storage node.

In view of the above, there is a need for a dynamic run time method which considers some or all the above challenges, and which employs read mechanisms that improve read performance.

SUMMARY

In accordance with an aspect of the disclosure, a method for dynamically replicating data in a disaggregated distributed storage system includes receiving, by a processor, a request from a controller to replicate data; dynamically selecting, by the processor, a storage node for replicating the data from among a plurality of storage nodes, based on one or more replication parameters associated with each storage node of the plurality of storage nodes, wherein the one or more replication parameters include at least one of a flash factor corresponding to the each storage node, and a latency between the controller and the each storage node; and providing, by the processor, information about the selected storage node to the controller for replicating the data.

In accordance with an aspect of the disclosure, a method for reading data from a disaggregated distributed storage system includes receiving, by a processor, a read request from at least one client device to read data, wherein the data is stored in a data replica group (DRG); and selecting, by the processor, a storage node included in the DRG for serving the read request based on one or more read parameters, wherein the one or more read parameters are determined in real-time, and wherein the one or more read parameters include a latency between the processor and each storage node included in the DRG, a flash factor of the each storage node, and load on the each storage node.

In accordance with an aspect of the disclosure, a device for dynamically replicating data in a disaggregated distributed storage system includes a memory configured to store instructions; and a processor configured to execute the instructions to: receive a request from a controller to replicate the data, dynamically select a storage node from among a plurality of storage nodes based on one or more replication parameters associated with each storage node of the plurality of storage nodes, wherein the one or more replication parameters comprise at least one of a flash factor corresponding to the each storage node, and a latency between the controller and the each storage node; and provide information about the selected storage node to the controller for replicating the data.

In accordance with an aspect of the disclosure, a disaggregated distributed storage system includes a storage pool including a plurality of storage nodes; a controller pool including a plurality of controllers; and a device for dynamically replicating data, wherein the device is configured to: receive a request from a controller to replicate the data, select a storage node from among the plurality of storage nodes based on one or more replication parameters associated with each storage node of the plurality of storage nodes; and provide information about the selected storage node to the controller for replicating the data, and wherein the one or more replication parameters include at least one of a flash factor corresponding to the each storage node, and a latency between the controller and the each storage node.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF DRAWINGS

The above and other aspects, features, and advantages of certain embodiments of the present disclosure will be more apparent from the following detailed description taken in conjunction with the accompanying drawings, in which.

Figure 1:
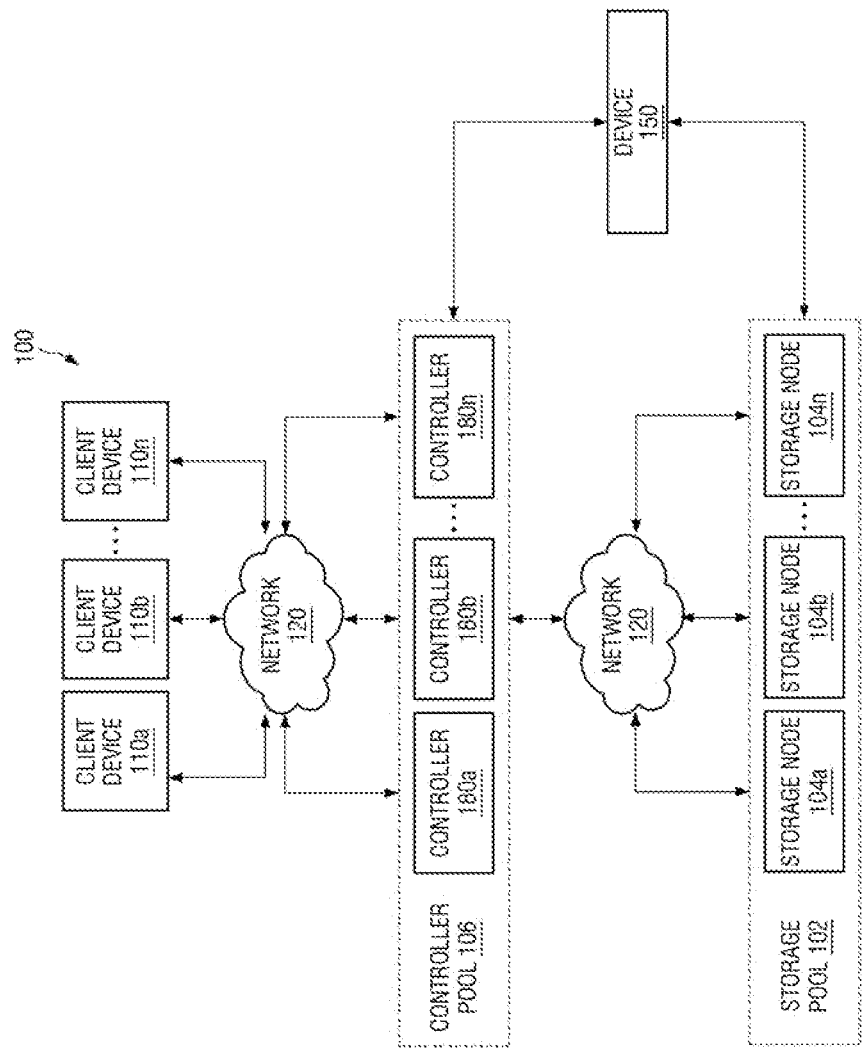
FIG. 1 illustrates an architecture of a disaggregated distributed storage system, in accordance with an embodiment of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

Hereinafter, example embodiments will be described with reference to the accompanying drawings.

As is traditional in the field, the example embodiments may be described and illustrated in terms of blocks which carry out a described function or functions. These blocks, which may be referred to herein as units, modules, circuits, blocks, controllers, nodes, or the like, are physically implemented by analog or digital circuits such as logic gates, integrated circuits, microprocessors, microcontrollers, memory circuits, passive electronic components, active electronic components, optical components, hardwired circuits, or the like, and in embodiments may be driven by firmware. The circuits may, for example, be embodied in one or more semiconductor chips, or on substrate supports such as printed circuit boards and the like. The circuits included in a block may be implemented by dedicated hardware, or by a processor (e.g., one or more programmed microprocessors and associated circuitry), or by a combination of dedicated hardware to perform some functions of the block and a processor to perform other functions of the block. Each block of embodiments may be physically separated into two or more interacting and discrete blocks without departing from the scope of the disclosure. Likewise, the blocks of embodiments may be physically combined into more complex blocks without departing from the scope of the disclosure.

As used herein, expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

In the present document, the word "exemplary" is used herein to mean "serving as an example, instance, or illustration". Any embodiment or implementation of the present subject matter described herein as "exemplary" is not necessarily to be construed as preferred or advantageous over other embodiments.

Particular embodiments are illustrated by way of example in the drawings and will be described in detail below. It should be understood, however that the description of these particular embodiments is not intended to limit the disclosure to the particular forms disclosed, but on the contrary, the disclosure is intended to cover all modifications, equivalents, and alternatives falling within the spirit and the scope of the disclosure.

The terms "comprises", "comprising", or any other variations thereof, are intended to cover a non-exclusive inclusion, such that a setup, device, or method that comprises a list of components or steps does not include only those components or steps but may include other components or steps not expressly listed or inherent to such setup or device or method. In other words, one or more elements in a device or system or apparatus proceeded by "comprises . . . a" does not, without more constraints, preclude the existence of other elements or additional elements in the device or system or apparatus.

In general, the same reference numerals are used throughout the description and the figures to reference the same, or substantially similar, features and components.

In the following detailed description reference is made to the accompanying drawings, in which are shown specific embodiments, by way of illustration. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

The term 'data replication' as used herein may refer to storing data in one or more storage nodes to increase data availability. More specifically, data replication may refer to creating a plurality of copies of the data and storing the plurality of copies at different storage nodes for fault tolerance or backup purposes, and to improve accessibility across a network after node failure. Data replication may ensure that the replicated copies are consistently updated and synchronized with the data to enable efficient reading without consistency issues, examples of which will be explained in detail with reference to FIGS. 1-5.

FIG. 1 illustrates an architecture of a disaggregated distributed storage system 100, in accordance with an embodiment of the present disclosure. The disaggregated distributed storage system 100 may enable efficient use of computing resources by decoupling computation resources and storage resources for scalability and flexibility. Accordingly, the disaggregated distributed storage system 100 may include a storage pool 102 and a controller pool 106. The storage pool 102 includes a plurality of storage nodes 104a, 104b, . . . , 104n. A storage node, for example, the storage node 104a, may be or include a physical server with one or more solid state drives. More specifically, the storage nodes 104a, 104b, . . . , 104n may serve as non-volatile storage nodes configured to store data regardless of whether power is supplied thereto, and may have a large storage capacity. As an example, the storage nodes 104a, 104b, . . . , 104n may include flash memories having a two-dimensional (2D) structure or a three-dimensional (3D) structure, for example a vertical NAND (V-NAND) structure. The plurality of storage nodes 104a, 104b, . . . , 104n may be nodes to which a standard protocol, such as a Serial Advanced Technology (SATA) protocol, a Serial-Attached Small Computer System Interface (SAS) protocol, or a non-volatile memory express (NVMe) protocol, is applied, however embodiments are not limited thereto. In embodiments, the plurality of storage nodes 104a, 104b, . . . , 104n may be heterogeneous storage nodes, and accordingly each storage node in the storage pool 102 may have different characteristics. As an example, each storage node of the plurality of storage nodes 104a, 104b, . . . , 104n may have varying storage spaces, different Central Processing Unit (CPU) resources, and the like.

Similarly, the controller pool 106 may include a plurality of controllers 108a, 108b, . . . , 108n. Each controller, for example, the controller 108a, in the controller pool 106 may manage an operation of storing data (e.g., write data) on a storage node in the storage pool 102, or an operation of retrieving data (e.g., read data) from a storage node in the storage pool 102. The storage pool 102 may be accessed by a controller over a network 120, for example an NVMe over Fabrics NVMeOF network. In embodiments, based on a controller (e.g., controller 108b) in the controller pool 106 receiving a request to write data via the network 120, the controller 108b may store the data in one or more storage nodes in the storage pool 102. More specifically, if the request is related to data replication, the controller 108b may identify the one or more storage nodes in the storage pool 102 and replicate the data in the one or more storage nodes. Further, each controller in the controller pool 106 may be configured to serve read requests received from one or more client devices 110a, 110b, . . . , 110n. More specifically, based on the replicated data being stored in the one or more storage nodes, the controller may identify a storage node among the one or more nodes for serving the read request. In embodiments, the plurality of controllers 108a, 108b, . . . , 108n may be heterogeneous, and accordingly each controller in the controller pool 106 may have different characteristics. As an example, each controller of the plurality of controllers 108a, 108b, . . . , 108n may have varying configurations in terms of Random Access Memory (RAM), CPU resources, processing speed, and the like.

In an embodiment, the controller pool 106 and the storage pool 102 may be implemented as separate semiconductor chips. In some embodiments, the controller pool 106 and the storage pool 102 may be integrated in or on the same semiconductor chip. As an example, the controller pool 106 may be any one of a plurality of modules included in an application processor (AP). The AP may be implemented as a System on Chip (SoC). Further, the storage pool 102 may be an embedded memory included in the AP or an NVM or memory module located outside the AP. In embodiments the storage pool 102 and the controller pool 106 together may be or may be included in a cluster.

Various embodiments of the present disclosure relate to a device 150 for dynamically replicating data in the disaggregated distributed storage system 100. More specifically, the device 150 efficiently determines a Data Replica Group (DRG) for placement of replicated data based on a dynamic nature of the plurality of storage nodes 104a, 104b, . . . , 104n. The term 'Data Replica Group' as used herein may refer to a collection of segments in which data is replicated. More specifically, a segment may be a granular unit in which the replicated data may be stored, and a collection of segments may be referred to herein as a DRG. In embodiments, the DRG includes segment information in each storage node from a fault domain. As such, flash awareness of the storage nodes 104a, 104b, . . . , 104n may be utilized to determine the DRG, thereby increasing lifetime of storage nodes 104a, 104b, . . . , 104n. Accordingly, the device 150 may determine a DRG by selecting a set of storage nodes from among the plurality of storage nodes 104a, 104b, . . . , 104n for replicating the data. More specifically, each storage node of the set of storage nodes may be determined from a fault domain. Moreover, the device 150 may be configured to serve copies of replicated data from different storage nodes in response to or based on read requests from client devices without consistency issues. An example of a device 150 for replicating data in the disaggregated distributed storage system 100 is explained in detail with reference to FIG. 2.

Figure 2:
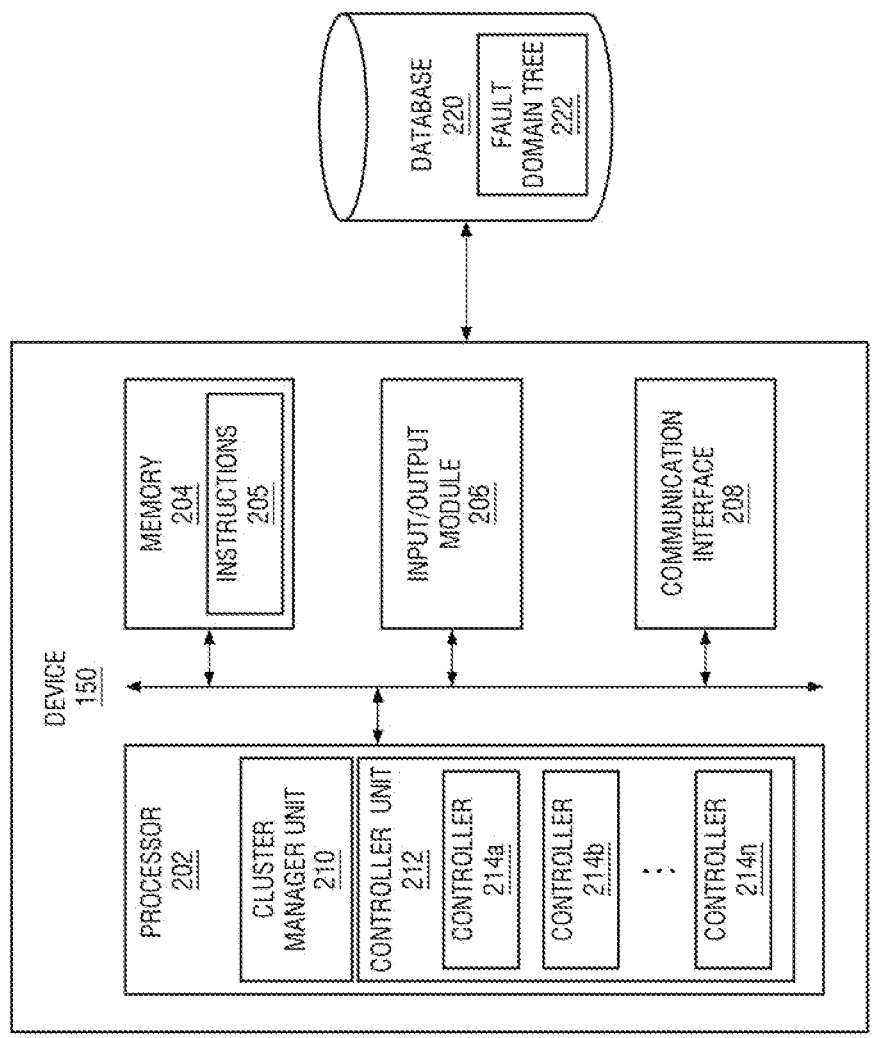
FIG. 2 illustrates a device for dynamically replicating data in a disaggregated distributed storage system, in accordance with an embodiment of the present disclosure.

FIG. 2 illustrates the device 150 for dynamically replicating data in the disaggregated distributed storage system 100, in accordance with an embodiment of the present disclosure. In an embodiment, the device 150 may be a standalone processor, such as a cluster manager capable of monitoring the operations within a cluster to identify events, such as a node failure events (e.g., failure of a controller or failure of a storage device). More specifically, the cluster manager may monitor operations of the plurality of storage nodes 104a, 104b, . . . , 104n, the plurality of controllers 108a, 108b, . . . , 108n and the one or more client devices 110a, 110b, . . . , 110n to gather information relative to the cluster, for example state changes of nodes (e.g., the plurality of controllers 108a, 108b, . . . , 108n, and the plurality of storage nodes 104a, 104b, . . . , 104n), characteristics of storage nodes 104a, 104b, . . . , 104n, characteristics of the controllers 108a, 108b, . . . , 108n, nature of read/write requests from client devices 110a, 110b, . . . 110n, load on controllers 108a, 108b, . . . , 108n, load on storage nodes 104a, 104b, . . . , 104n, and the like. In another embodiment, the device 150 may be a controller from the controller pool 106 configured to dynamically replicate data and serve read request from the replicated data. In yet another embodiment, the device 150 may include components for performing functionalities of the cluster manager and the plurality of controllers 108a, 108b, . . . , 108n to control access to the plurality of storage nodes 104a, 104b, . . . , 104n. In embodiments, the device 150 may be a distributed or centralized server capable of performing one or more of the operations described herein.

The device 150 is depicted to include a processor 202, a memory 204, an Input/Output (I/O) module 206, and a communication interface 208. In some embodiments, the device 150 may include more or fewer components than those depicted herein. The various components of the device 150 may be implemented using hardware, software, firmware or any combinations thereof. Further, the various components of the device 150 may be operably coupled with each other. More specifically, various components of the device 150 may be capable of communicating with each other using communication channel media (such as buses, interconnects, etc.). The processor 202 includes a cluster manager unit 210 and a controller unit 212. In embodiments, one or more components of the device 150 may be implemented in a single server or a plurality of servers, which may be remotely placed from each other.

In one embodiment, the processor 202 may include a multi-core processor, a single core processor, or a combination of one or more multi-core processors and one or more single core processors. For example, the processor 202 may include one or more of various processing devices, such as a coprocessor, a microprocessor, a controller, a digital signal processor (DSP), a processing circuitry with or without an accompanying DSP, or various other processing devices including, a microcontroller unit (MCU), a hardware accelerator, a special-purpose computer chip, or the like. In embodiments one or more functions of the processor 202 described herein may be distributed among internal components of the processor 202, for example the cluster manager unit 210 and the controller unit 212.

In one embodiment, the memory 204 may be capable of storing machine executable instructions, referred to herein as instructions 205. In an embodiment, the processor 202 may include an executor of software instructions. As such, the processor 202 may be capable of executing the instructions 205 stored in the memory 204 to perform one or more operations described herein. The memory 204 may be any type of storage accessible to the processor 202 to perform respective functionalities, examples of which will be explained in detail with reference to FIGS. 2 to 5. For example, the memory 204 may include one or more volatile or non-volatile memories, or a combination thereof. For example, the memory 204 may include semiconductor memories, such as flash memory, mask read-only memory (ROM), PROM (programmable ROM), EPROM (erasable PROM), RAM (random access memory), etc. and the like.

In an embodiment, the processor 202 may execute the instructions 205 to: (1) compute a first weight value for each storage node of the plurality of storage nodes 104a, 104b, . . . , 104n, (2) compute a second weight value for each fault domain, (3) identify a set of fault domains in the disaggregated distributed storage system based on the second weight value, (4) dynamically determine the storage node with a highest first weight value in each fault domain, (5) create a DRG based on the information of the determined storage nodes, and (6) provide information of the determined storage nodes (e.g., the DRG) to the controller for replicating data. After the data is replicated in the determined storage nodes (e.g., the DRG), the processor 202 may execute the instructions 205 to: (1) update one or more replication parameters associated with each storage node in the DRG, and (2) recompute the first weight value for each storage node in the DRG. The processor 202 may also read requests from client devices to determine a number of read requests received to read data from the DRG. Further, when the processor 202 receives a read request for reading data from a DRG, the processor 202 may execute the instructions 205 to: (1) determine a storage node from the DRG for serving the read request, (2) move the data to a new DRG based on a number of read request from the DRG being greater than a threshold value, and (3) update the DRG based on moving the data to a new DRG.

In an embodiment, the I/O module 206 may receive inputs from and provide outputs to peripheral devices, for example client devices 110a, 110b, . . . , 110n. In some embodiments, when the processor 202 executes operations of the cluster manager alone, the I/O module 206 may receive inputs from and provide outputs to the plurality of controllers 108a, 108b, . . . , 108n, and the plurality of storage nodes 104a, 104b, . . . , 104n in the disaggregated distributed storage system 100.

In an embodiment, the communication interface 208 may communicate with other entities in or elements of the disaggregated distributed storage system 100 with different communication protocols. As such, the communication interface 208 may receive read requests and write requests from the one or more client devices 110a, 110b, . . . , 110n. A write request from a client device of the one or more client devices 110a, 110b, . . . 110n may include information related to at least: the client device (e.g., client device characteristics, client identifier (ID), etc.), and data. A read request from a client device of the one or more client devices 110a, 110b, . . . , 110n may include information related to the client device and storage information related to the data. For example, address location of data in the primary server and address location of the replicated data (or DRG). The information included in the read request and write request discussed above are used as examples, and the read request and write request may include other additional information. For example, in embodiments, at least one of the read request and write request may include information related to a specific controller or a set of controllers in the controller pool 106 which are capable of serving the at least one of the read request and the write request, one or more read/write rules defined by a client device for replicating or reading data, and the like.

The device 150 is depicted to be in operative communication with a database 220. In one embodiment, the database 220 is may store a fault domain tree 222. The fault domain tree 222 may be or may include a topology of the disaggregated distributed storage system 100. An example of a fault domain tree is described below with reference to FIG. 3.

Figure 3:
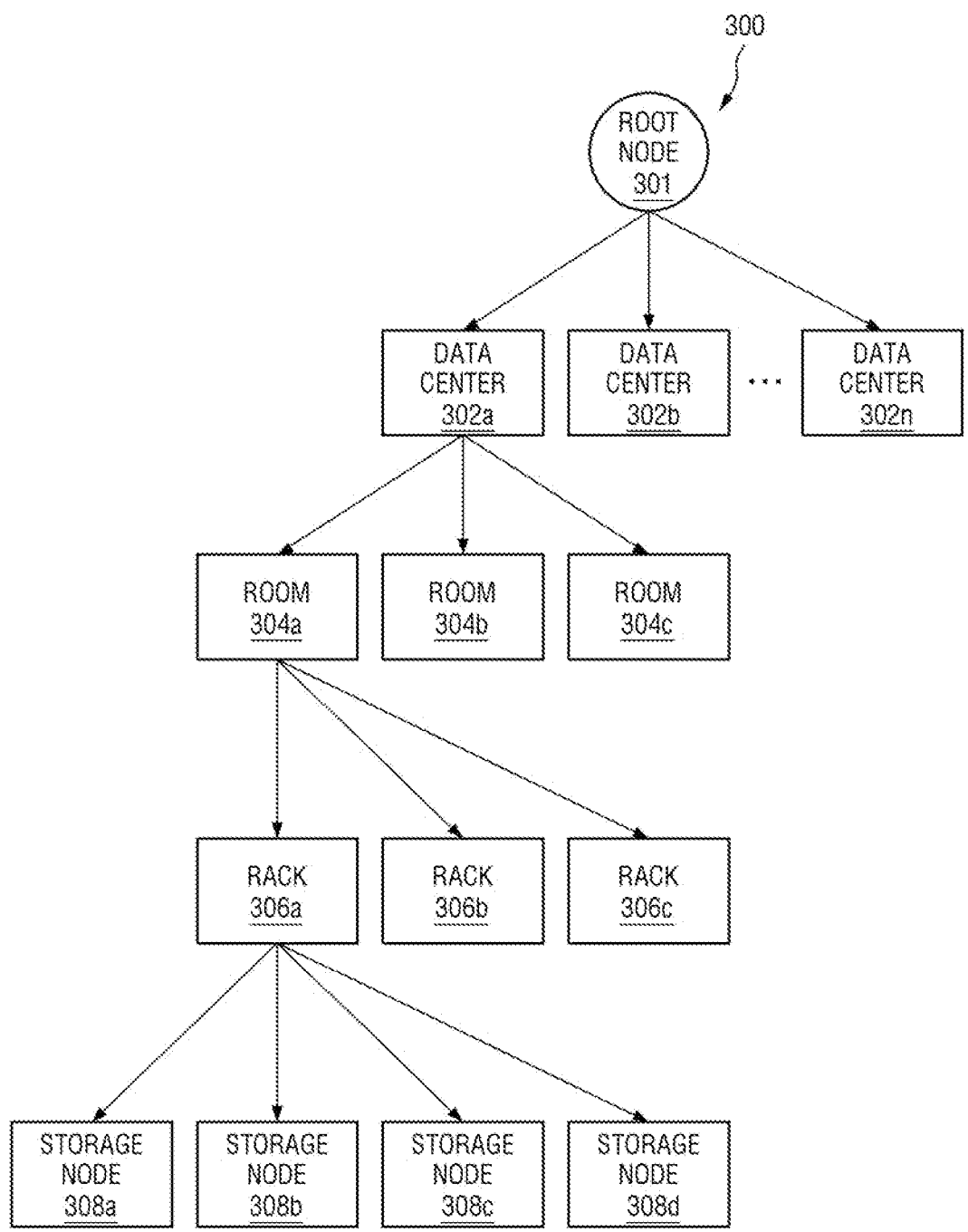
FIG. 3 illustrates a fault domain tree depicting a topology of the storage nodes in the storage pool, in accordance with an embodiment of the present disclosure.

Referring to FIG. 3, a fault domain tree 300 depicting a topology of the plurality of storage nodes 104a, 104b, . . . , 104n, in the storage pool 102 of the disaggregated distributed storage system 100 is illustrated, in accordance with an embodiment of the present disclosure. The fault domain tree 300 may be an example of the fault domain tree 222 stored in the database 220 in relation to the disaggregated distributed storage system 100. The fault domain tree 300 may include a plurality of nodes indicating various storage levels in the disaggregated distributed storage system 100. For example, the plurality of nodes may correspond to nodes distributed across different storage levels, for example a data center level, a room level, and a rack level, however embodiments are not limited thereto. In an embodiment, each of these nodes may include at least one storage node. For example, if the plurality of nodes corresponds to a plurality of racks, each of the racks may include at least one storage node (e.g., storage node 104a). As another example, if the plurality of nodes corresponds to a plurality of rooms, each of the rooms may include at least one storage node, for example, a storage node on each rack of the room. Accordingly, the fault domain tree 300 may show interconnections between different fault domains in the disaggregated distributed storage system 100.

The term 'fault domain' as used herein may refer to a set of nodes in disaggregated distributed storage system 100 that share a single point of failure. In other words, a set of nodes among the plurality of nodes in the fault domain tree 300 may be included in a fault domain. For example, the fault domain tree 300 may include a plurality of canonical levels of fault domains, for example, a data center level, a room level, a rack level, a row level, and a storage node level. In this example representation, the fault domain tree 300 may include data centers 302a, 302b, . . . 302n. Each of these data centers may have one or more rooms, for example, the rooms 304a, 304b, and 304c included in the data center 302a, and one or more rooms included in the data center 302b. Further, each of these rooms may have one or more racks, for example racks 306a, 306b, and 306c included in the room 304a.

In embodiments, in order to be fault tolerant at a certain vela set of fault domains may be required at that level. For example, to be rack fault tolerant, the data may be distributed across a set of racks from among a plurality of racks associated with the room, and these set of racks may be referred to as a 'set of fault domains'. More specifically, at least one storage node is selected from each fault domain of the set of fault domains for replicating the data. As an example, if the fault domain is specified as rack level and the set of fault domains are identified as racks 306a and 306b, then at least one storage node may be selected from each of these fault domains. For example, storage node 308a from among storage nodes 308a, 308b, 308c, and 308d from the rack 306a may be selected for replicating data. As another example, if room level fault tolerance is specified by a client device, then a set of fault domains may be selected at room level, for example, rooms 304b, 304c may be the set of fault domains and a storage node may be selected from each of these rooms. As an example scenario, if room 304b is under maintenance and a client requests data that was replicated in fault domains corresponding to rooms 304b and 304c, then the data may be retrieved from a storage node in room 304c in which the replicated data was stored. The fault domain tree 300 of FIG. 3 is shown for exemplary purposes, and in embodiments the fault domain tree may include fewer or more nodes and/or fewer or more canonical levels of storage than those depicted in FIG. 3. Accordingly, the fault domain tree 300 may capture the topology of the plurality of storage nodes 104a, 104b, . . . , 104n, and an example of a method for determining the set of fault domains and at least one storage node from each fault domain of the set of fault domains will be explained in detail below.

Referring back to FIG. 2, the database 220 may store the topology of the storage nodes 104a, 104b, . . . , 104n in the disaggregated distributed storage system 100 as the fault domain tree 300 shown in FIG. 3. Further, the database 220 may also include historical information related to read requests and write requests, for example client device ID, controller ID, storage related information, etc. In some embodiments, the database 220 may store a plurality of replication rules corresponding to the one or more client devices 110a, 110b, . . . 110n. For example, the replication rules may be predefined for each client device based on requirements and stored in the database 220 during onboarding of the client device. The replication rule may include a replication factor and a replication level. The replication factor may indicate a number of copies of replicated data to be stored or the number of storage nodes in which the replicated data has to be stored. The replication level may indicate a stage or node level at which the data has to be replicated. As an example, a replication rule may be specified as '3-way rack level replication'. The term '3-way' may indicate a replication factor, and 'rack-level' may indicate a replication level specified by the client device for replicating the data. In other words, the replication level may indicate the fault domain level at which the client device desires to replicate data. In an embodiment, a client device may specify more than one replication rule for serving a variety of write requests, for example, a first replication rule based on the client device sending a write request for a first data type, and a second replication rule based on the client device sending a write request for a second data type. As such, all the replication rules relating to one client device may be collated and stored together and are retrieved based on the read request received from the client device. Further, in embodiments these replication rules are not fixed and may be modified based on client device requirements.

The database 220 may include multiple storage units such as hard disks and/or solid-state disks in a redundant array of inexpensive disks (RAID) configuration. In some embodiments, the database 220 may include a storage area network (SAN) and/or a network attached storage (NAS) system. In one embodiment, the database 220 may correspond to a distributed storage system, wherein individual databases may be configured to store custom information, such as replication policies, list of client devices 110a, 110b, . . . , 110n in a cluster, specification of client devices, replication rule of the one or more client devices 110a, 110b, . . . 110n, list of controllers, specification of controllers, controller assignment policies, DRG related information for each replicated data, read serving policies, etc.

In some embodiments, the database 220 may be integrated within the device 150. For example, the device 150 may include one or more hard disk drives as the database 220. In other embodiments, the database 220 may be external to the device 150 and may be accessed by the device 150 using a storage interface. The storage interface may be any component capable of providing the processor 202 with access to the database 220. The storage interface may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 202 with access to the database 220.

As discussed above, the communication interface 208 may receive a request from a controller in the controller pool 106 to replicate data. The request may include information related to the client device and data that may be replicated. In embodiments the controller may send the request for caching one or more DRGs to replicate data when requests are received from client devices, or the controller may dynamically send the request based on receiving a write request from a client device of the one or more client devices 110a, 110b, . . . , 110n in the disaggregated distributed storage system 100. In an embodiment, the replication rule may be specified by the client device as part of the request, for example the request from the controller to replicate data. In another embodiment, the replication rule corresponding to each client device may be stored in the database 220 and may be retrieved based on receiving the request from the controller to replicate data for a specific client. In yet another embodiment, different DRGs that meet different client device requirements may be generated based on the request being received from the controller. In an embodiment, the request may be forwarded to the processor 202 which may perform one or more operations described herein to dynamically replicate data in the disaggregated distributed storage system 100. The processor may forward the request from the controller to the cluster manager unit 210 of the processor 202.

The cluster manager unit 210 in conjunction with the instructions 205 stored in the memory 204 may create a DRG group for the controller based on receiving the request from the controller. In an embodiment, the cluster manager unit 210 may identify a set of fault domains from a plurality of fault domains in the disaggregated distributed storage system 100 based on the fault domain tree and the replication rule. As an example, if the replication rule specifies a 2-way room level replication, the data may be replicated twice (e.g., the replication factor) and stored in two storage nodes in different rooms. In such cases, a DRG group may include segments from two storage nodes for replicating the data.

In an embodiment, the set of fault domains may be selected from the fault domain tree 300 based on second weight values. The cluster manager unit 210 may manage the fault domain tree 300 and as such, the cluster manager unit 210 may be configured to determine the second weight values associated with each fault domain. Referring now to FIG. 3 in conjunction with FIG. 2, each storage node 308*a*, 308*b*, . . . , 308*n* in the fault domain tree 300 may be associated with a first weight value. The first weight value of a storage node may be determined based on one or more replication parameters. Some examples of the one or more replication parameters include available storage space in a storage node, a flash factor of the storage node, and a latency between the controller and the storage node, however embodiments are not limited thereto. The flash factor of the storage node may be determined based on one or more of a wear level of the storage node and a type of the flash device, for example single-level cell (SLC) flash, quad-level cell (QLC) flash, multi-level cell (MLC) flash, etc. The wear level of the storage node may be determined based on a number of Program/Erase (P/E) cycles performed on the storage node. As an example scenario, for a storage node with 1 terabyte of storage space, and having a 50% wear level (e.g., 10,000 P/E cycles of a total of 20,000 P/E cycles for which the storage node is rated), the weight value may be determined as 0.6. This example for determining the first weight value of the storage node is shown for exemplary purposes, and the first weight values associated with each storage node of the plurality of storage nodes 104*a*, 104*b*, . . . , 104*n* may also be determined as a weighted average in which confidence values for each replication parameter is provided. For example, if the flash factor contributes more to identifying the storage nodes in which data needs to be replicated, then the flash factor may be provided a high confidence value when compared with the available storage space and the latency of the controller. Accordingly, the first weight values of all the storage nodes 104*a*, 104*b*, . . . , 104*n* in the disaggregated distributed storage system 100 may be determined.

In an embodiment, the cluster manager unit 210 may determine a second weight value for each fault domain based on the first weight value associated with each storage node of the plurality of storage nodes in a corresponding fault domain. For example, a second weight value $w_r$ associated with each rack fault domain may be determined based on first weight values associated with storage nodes on the corresponding rack. As an example, second weight value $w_{r1}$ associated with rack 306*a* may be determined based on first weight values $ws_1$, $ws_2$, $ws_3$, and $ws_4$, which may be associated with storage nodes 308*a*, 308*b*, 308*c* and 308*d*, respectively. Similarly, a second weight value $w_{m1}$ associated with the room 304*a* may be determined based on first weight values associated with the storage nodes in the same fault domain, for example the storage nodes in racks 306*a* and 306*b*. In embodiments, the first weight values of the storage nodes in a fault domain may be aggregated to determine the second weight values of the corresponding fault domain, or any other averaging technique may be utilized to determine the second weight value of the corresponding fault domain and are not explained herein for the sake of brevity. Further, in embodiments the first weight values associated with the storage nodes and the second weight values associated with the plurality of fault domains in the disaggregated distributed storage system 100 may be included in the fault domain tree 300 and may be stored in the database 220.

In an embodiment, the cluster manager unit 210 may identify the set of fault domains from the plurality of fault domains based on fault domain tree 300 and the replication rule. For example, if the replication rule specifies a 3-way rack level replication, then three different storage nodes from 3 different racks (e.g., fault domains) may be identified based on their second weight values. More specifically, optimal fault domains are identified from among the plurality of fault domains. In an embodiment, the fault domains with highest weight values may be identified based on the replication factor. For example, if the replication factor is 2, then two racks with highest second weight values may be identified. Then, a storage node may be identified from each of these set of fault domains. For example, fault domain A (e.g., rack A) may include 2 storage nodes ($N_1$, and $N_2$) with weight values 0.5, and 0.9, respectively and fault domain B (e.g., rack B) may include 3 storage nodes ($N_4$, $N_5$, $N_6$ and $N_7$) with weight values 0.4, 0.5, 0.75 and 0.7, respectively. In this example scenario, the storage node $N_1$ may have a relatively large amount of available space (e.g., 1 terabyte of storage space) but the wear level of the storage node $N_1$ may be 80%, whereas another storage node $N_2$ in the same fault domain A (e.g., rack A) may have relatively less space than that of storage node $N_1$ (e.g., 1 gigabyte of storage space) but the wear level of the storage node $N_2$ may be 10%. In such a scenario, the first weight value of storage node $N_1$ may be less when compared with the first weight value of the storage node $N_2$. As such, the cluster manager unit 210 may select the storage node in each fault domain with a highest weight value, for example, node $N_2$ from rack A and node $N_6$ from rack B.

As such, the dynamic factors of the storage nodes, for example the heterogeneous nature of the storage nodes, network traffic and flash awareness may be factored in selection of a storage node from each fault domain, which may help to ensure that lifetimes of the storage nodes are increased and all the storage nodes are uniformly utilized without overloading one or more storage nodes in the disaggregated distributed storage system 100.

In an embodiment, the cluster manager unit 210 may provide the information of the determined or selected storage node to the controller for replicating data. The storage node may correspond to a fault domain and information of the determined storage nodes from each of the set of fault domains may be provided to the controller for replicating data. Accordingly, the cluster manager unit 210 may create a DRG based on the at least one storage node determined or selected from each fault domain of the set of fault domains. More specifically, a segment may be selected from a determined storage node in each fault domain of the set of fault domains, and these segments may be grouped together to form or be included in the DRG. For example, the DRG may have the replication factor number of segments grouped together to form the DRG. As such, the DRG may be a unit of replication and replication recovery as well. The DRG may be provided to the controller that sent the request for replicating data.

In embodiments the first weight values of the plurality of storage nodes in the fault domain tree 300 may be recomputed at defined time intervals. In an embodiment, the first weight values may be recomputed after replicating data (e.g., creation of a DRG). For example, one or more replication parameters, for example, available storage space, flash factor and latency between the controller and the each storage node of the determined storage nodes in the DRG may vary after creation of the DRG. As such, there may be dynamic changes in the replication parameters associated with storage nodes in the disaggregated distributed storage system 100, and therefore the first weight values may be recomputed. In another embodiment, the first weight values of the plurality of storage nodes may be updated if one or more nodes in the fault domain tree are disabled. In one example scenario, the rack 306a (e.g., a fault domain) may be disabled due to scheduled maintenance, and therefore storage nodes 308a, 308b, 308c, and 308d from the rack 306a may not be available for storage operations. Therefore, the first weight values associated the storage nodes 308a, 308b, 308c, and 308d from the rack 306a may be updated. In yet another embodiment, the first weight values of the plurality of storage nodes may be updated if one or more storage nodes are added in the disaggregated distributed storage system 100 for increasing storage capacity of the disaggregated distributed storage system 100. The examples for creation of one DRG group by the cluster manager unit 210 are explained above for exemplary purposes, and the cluster manager unit 210 may create one or more DRG groups for the controller based on receiving the request from the controller. The controller, based on receiving the DRG, may replicate the data in the segments of the determined storage nodes of the set of fault domains.

In an embodiment, the communication interface 208 may receive a read request from at least one client device to read data. The data may be stored in a DRG as explained previously. Accordingly, the read request may include one or more of: information related to the client device ID, controller ID, and data storage related information. The communication interface 208 may forward the read request to the processor 202 for processing, and providing the data to the client device. The processor 202 may forward the read request to the controller unit 212. In an embodiment, the controller unit 212 may include one or more controllers 214a, 214b, . . . , 214n. The controllers 214a, 214b, . . . , 214n may be or may correspond to examples of the controllers 108a, 108b, . . . , 108n in the disaggregated distributed storage system 100, for controlling storage operation in the storage nodes 104a, 104b, . . . , 104n of the storage pool 102. Based on a read request including a controller ID being received, the read request may be sent to the specific controller corresponding to the controller ID. In embodiments, operations of the cluster manager unit 210 may be performed by any one of the controllers, for example, the controller 214a, or may be individually by each of the one or more controllers 214a, 214b, . . . , 214n.

Some embodiments of the present disclosure are explained with reference to a single controller, for example, the controller 214a, however, embodiments of the present disclosure may be practiced with more than one controller simultaneously serving a plurality of client devices, for example the client devices 110a, 110b, . . . 110n.

In an embodiment, the controller 214a may be configured to determine or select a storage node from the DRG for serving the read request based on one or more read parameters. The one or more read parameters in relation to each storage node in the data replica group may include one or more of: a latency between the controller and each storage node of the DRG, a flash factor of each storage node in the DRG, and load on each storage node in the DRG. As an example, the one or more read parameters associated with a storage node may be used to determine a performance metric of each of the storage nodes in the DRG. The performance metric of each storage node in the DRG may be computed based on weighted averaging techniques. Accordingly, one storage node in the DRG with best performance may be selected or identified for serving the read request. As an example, a storage node having a highest performance metric in the DRG may be selected for serving the read request to the client device. In another embodiment, the cluster manager 210 may analyze the read request and identify the storage node from the DRG based on the one or more read parameters as discussed above. The cluster manager 210 may then share information related to the determined storage node from the DRG to the controller 214a for serving the read request.

The selection of the storage node from the DRG based on the one or more read parameters which are dynamic to serve the read request may help to ensure that a load is distributed equally among all storage nodes in the disaggregated distributed storage system 100 and a lifetime of the storage nodes may also be significantly improved as flash awareness is factored in to determine the storage node.

In an embodiment, the cluster manager unit 210 may continuously track a number of read requests for each DRG created by the cluster manager unit 210. The cluster manager unit 210 may store read counts corresponding to the number of read requests from a DRG in the database 220. In an embodiment, based on the number of read request (e.g., read count $R_C$) from a DRG (e.g., $DRG_1$) being greater than a threshold value (e.g., $R_C > T_R$), the cluster manager unit 210 create a new DRG ($DRG_{N1}$) for the replicated data in the $DRG_1$ and move the replicated data to the new DRG ($DRG_{N1}$). For example, as the DRG includes information of segments from the determined storage nodes in which data is replicated, the information of segments may be updated to form the new DRG ($DRG_{N1}$). In embodiments, the new DRG may include information of segments associated with storage nodes that are determined to create the new DRG as discussed above. An example of a process for replicating data and creating DRGs is explained below with reference to FIG. 4.

Figure 4:
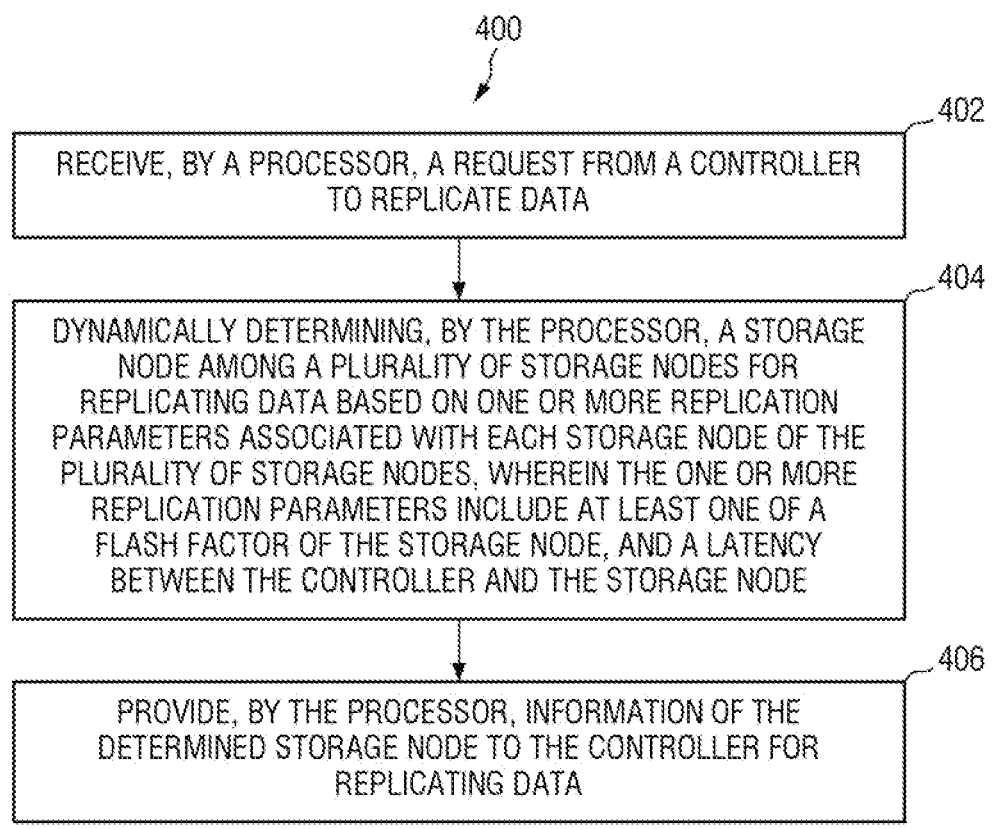
FIG. 4 is a flowchart illustrating a method for dynamically replicating data in a disaggregated distributed storage system, in accordance with an embodiment of the present disclosure.

FIG. 4 is a flowchart illustrating a process 400 for dynamically replicating data in a disaggregated distributed storage system 100, in accordance with an embodiment of the present disclosure. The process 400 depicted in the flow diagram may be executed by, for example, the processor 202 of the device 150 operating as the cluster manager unit 210 as shown and explained with reference to FIGS. 2-3. Operations of the flow diagram, and combinations of operation in the flow diagram, may be implemented by, for example, hardware, firmware, a processor, circuitry and/or a different device associated with the execution of software that includes one or more computer program instructions. The operations of the process 400 are described with respect to the cluster manager unit 210 of the processor 202. In embodiments, the operations of the process 400 may be described and/or practiced using one or more processors of a system/device other than the cluster manager unit 210, for example, a controller from among the controllers 214a, 214b, . . . , 214n of the controller unit 212. The process 400 starts at operation 402.

At operation 402 of the process 400, a request from a controller to replicate data is received by a processor, such as the processor 202 shown and explained with reference to FIG. 2. As discussed above, the cluster manager unit 210 of the processor 202 may be standalone processor configured to replicate data in the disaggregated distributed storage system 100, or the cluster manager unit 210 may be or include other components of the disaggregated distributed storage system 100 to perform one or more operations described herein. The request may be received from the controller to cache one or more DRGs for serving client devices, or the request may be sent in response to receiving a write request for replicating data.

At operation 404 of the process 400, a storage node among a plurality of storage nodes may be dynamically determined or selected for replicating data based on one or more replication parameters associated with each storage node of the plurality of storage nodes. The one or more replication parameters for a storage node in a fault domain may include an available storage space in the storage node, a flash factor of the storage node, and a latency between the controller and the storage node. The flash factor of the storage node may be determined based on one or more of: a wear level of the storage node, and a type of the storage node. The wear level of the storage node may be determined based on a number of P/E cycles performed on the storage node. For example, a set of fault domains from a plurality of fault domains may be determined based on the replication rule and the fault domain tree. An example of identifying a storage node from each fault domain is explained above with reference to FIGS. 2-3.

At operation 406 of the process 400, information of the determined storage node may be provided to the controller for replicating data. For example, determined storage nodes from each fault domain of the set of fault domains may be used to create a DRG, and the information related to the DRG may be provided to the controller for replicating the data. An example of a process for serving read requests from replicated data stored in a DRG is explained below with reference to FIG. 5.

Figure 5:
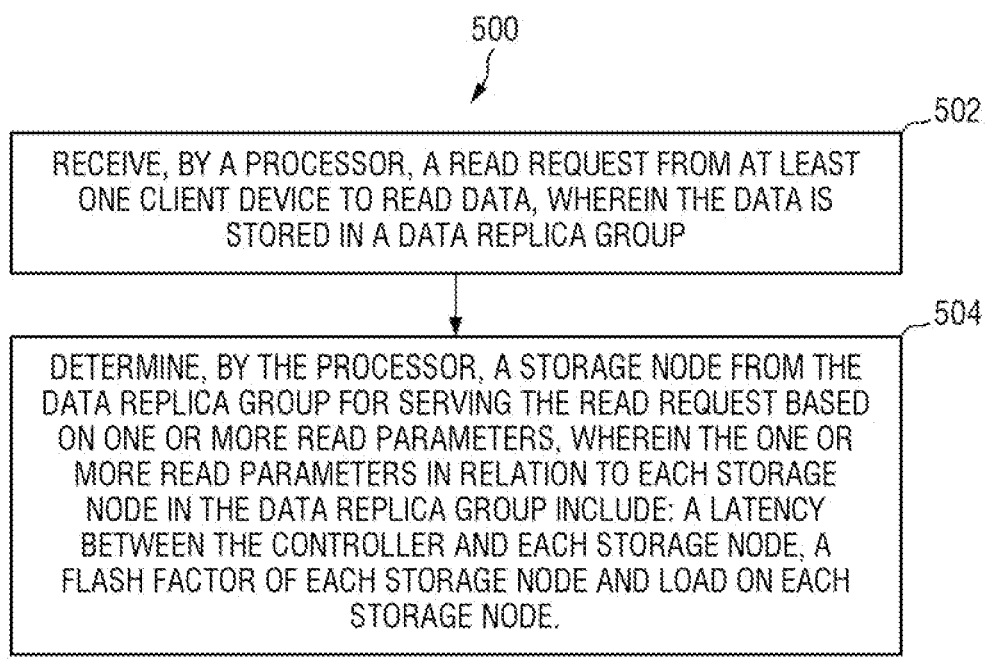
FIG. 5 is a flowchart illustrating a method for dynamically reading data from a disaggregated distributed storage system, in accordance with an embodiment of the present disclosure.

FIG. 5 is a flowchart illustrating a process 500 for reading data from a disaggregated distributed storage system, in accordance with an embodiment of the present disclosure. The process 500 depicted in the flow diagram may be executed by, for example, the device 150 discussed above with reference to FIGS. 2-3. Operations of the flow diagram, and combinations of operation in the flow diagram, may be implemented by, for example, hardware, firmware, a processor, circuitry and/or a different device associated with the execution of software that includes one or more computer program instructions. The operations of the process 500 are described herein with respect to a controller included in the processor 202 of the device 150. In embodiments, the operations of the process 500 may be described and/or practiced using one or more processors of a system or device other than the controller in the processor 202, for example, the cluster manager unit 210 of the processor 202. In such cases, the cluster manager unit 210 may identify the storage node to serve the read request, but the controller may implement the read request to retrieve the replicated data from the identified storage node. The process 500 starts at operation 502.

At operation 502 of the process 500, a read request is received from at least one client device to read data by a processor, for example the processor 202 of the device 150. In an embodiment, the data may be replicated and stored in a data replica group as discussed above with reference to FIG. 4.

At operation 504 of the process 500, a storage node from the DRG may be determined or selected for serving the read request based on one or more read parameters. In an embodiment, the one or more read parameters in relation to each storage node in the data replica group may include a latency between the controller and each storage node, a flash factor of each storage node and load on each storage node. More specifically, performance metrics of each storage node in the DRG may be determined based on the one or more read parameters and a storage node having a best performance (e.g., highest performance metric) may be selected to provision data for the read request.

The sequence of operations of the process 400 and the process 500 may be executed in any order or combination. Further, one or more operations may be grouped together and performed in form of a single step, or one operation may have several sub-steps that may be performed in parallel or in sequential manner.

Figure 6:
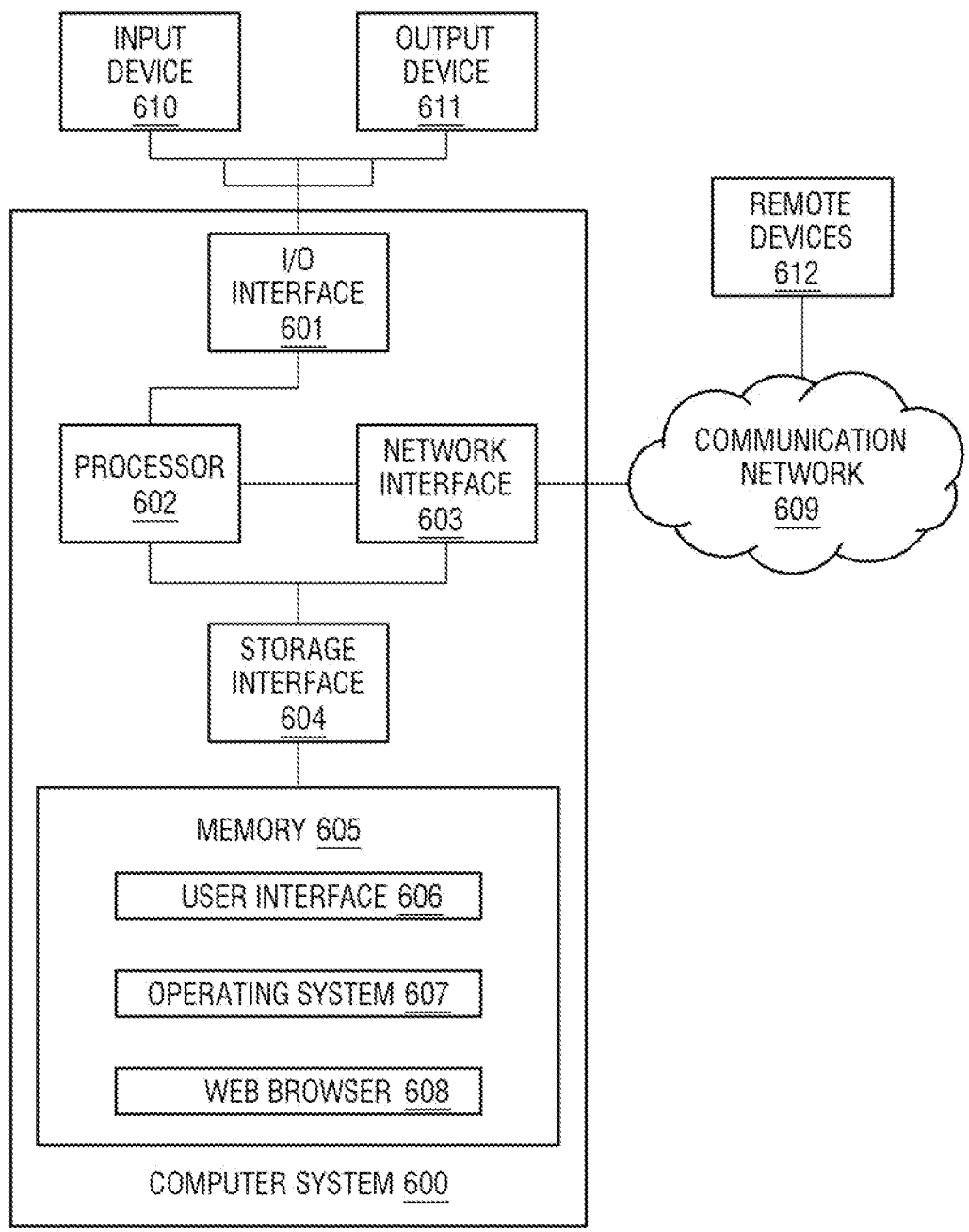
FIG. 6 shows a block diagram of a general-purpose computer for dynamically replicating data and reading data in a disaggregated distributed storage system, in accordance with an embodiment of the present disclosure.

The flow diagrams illustrated in FIGS. 4-5, or one or more operations of the process 400 and process 500, may be implemented using software including computer-executable instructions stored on one or more computer-readable media (e.g., non-transitory computer-readable media, such as one or more optical media discs, volatile memory components (e.g., DRAM or SRAM), or non-volatile memory or storage components (e.g., hard drives or solid-state non-volatile memory components, such as flash memory components) and executed on a computer (e.g., any suitable computer, such as a laptop computer, net book, web book, tablet computing device, smart phone, or other mobile computing device). Such software may be executed, for example, on a single local computer FIG. 6 shows a block diagram of a general-purpose computer for dynamically replicating data in a disaggregated distributed storage system, in accordance with an embodiment of the present disclosure. The computer system 600 may include a processor 602, which may be for example as a CPU. The processor 602 may include at least one data processor. The processor 602 may include specialized processing units such as integrated system controllers, bus controllers, memory management control units, floating point units, graphics processing units, digital signal processing units, etc. The computer system 600 may be analogous to or correspond to the device 150 shown in FIG. 2.

The processor 602 may be communicate with one or more I/O devices, for example input device 610 and output device 611, via I/O interface 601. The I/O interface 601 may employ communication protocols/methods, for example audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), Radio Frequency (RF) antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), however embodiments are not limited thereto.

Using the I/O interface 601, the computer system 600 may communicate with one or more I/O devices. For example, the input device 610 may be or include an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output device 611 may be or include a printer, fax machine, video display (e.g., cathode ray tube (CRT), liquid crystal display (LCD), light-emitting diode (LED), plasma, Plasma display panel (PDP), Organic light-emitting diode display (OLED) or the like), audio speaker, etc.

In some embodiments, the computer system 600 may be connected to the remote devices 612 through a communication network 609. The remote devices 612 may be peripheral devices such as client devices 110a, 110b, . . . 110n which communicate with the device 150 for reading/writing data. The processor 602 may communicate with the communication network 609 via a network interface 603. The network interface 603 may communicate with the communication network 609. The network interface 603 may employ connection protocols including a direct connect protocol, an Ethernet protocol (e.g., twisted pair 10/100/1000 Base T), a transmission control protocol/internet protocol (TCP/IP) protocol, a token ring protocol, and an IEEE 802.11a/b/g/n/x protocol, however embodiments are not limited thereto. The communication network 609 may include a direct interconnection, local area network (LAN), wide area network (WAN), wireless network (e.g., using Wireless Application Protocol), the Internet, however embodiments are not limited thereto. Using the network interface 603 and the communication network 609, the computer system 600 may communicate with the remote devices 612. The communication network 609 may include a direct interconnection, an e-commerce network, a peer to peer (P2P) network, Wi-Fi, 3GPP and such. The communication network 609 may include a variety of network devices, including routers, bridges, servers, computing devices, storage devices, etc.

In some embodiments, the processor 602 may communicate with a memory 605 (e.g., RAM, ROM, etc.) via a storage interface 604. The storage interface 604 may connect to memory 605 including, without limitation, memory drives, removable disc drives, etc., employing connection protocols such as SATA, Integrated Drive Electronics (IDE), IEEE-1394, USB, fiber channel, SCSI, etc. The memory drives may further include a drum, magnetic disc drive, magneto-optical drive, optical drive, RAID, solid-state memory devices, solid-state drives, etc.

The memory 605 may store a collection of program or database components, including, without limitation, user interface 606, an operating system 607, web browser 608, etc. In some embodiments, computer system 600 may store user/application data, such as the data, variables, records, etc., as described in this disclosure. Such databases may be implemented as fault-tolerant, relational, scalable, secure databases such as Oracle® or Sybase®.

The operating system 607 may facilitate resource management and operation of the computer system 600. Examples of operating systems include, without limitation, APPLE MACINTOSH® OS X, UNIX®, UNIX-like system distributions (e.g., BERKELEY SOFTWARE DISTRIBUTION™ (BSD), FREEBSD™, NETBSD™, OPENBSD™, etc.), LINUX DISTRIBUTIONS™ (e.g., RED HAT™, UBUNTU™, KUBUNTU™, etc.), IBM™ OS/2, MICROSOFT™ WINDOWS™ (XP™ VISTA™/7/8, 10 etc.), APPLE® IOS™ GOOGLE® ANDROID™, BLACKBERRY® OS, or the like.

In some embodiments, the computer system 600 may implement a web browser 608 stored program component. The web browser 608 may be a hypertext viewing application, for example MICROSOFT® INTERNET EXPLORER™, GOOGLE® CHROME™, MOZILLA® FIREFOX™, APPLE® SAFARI™, etc. Secure web browsing may be provided using Secure Hypertext Transport Protocol (HTTPS), Secure Sockets Layer (SSL), Transport Layer Security (TLS), etc. Web browsers 608 may utilize facilities such as AJAX™, DHTML™, ADOBER FLASH™, JAVASCRIPT™, JAVA™, Application Programming Interfaces (APIs), etc. In some embodiments, the computer system 600 may implement a mail server stored program component. The mail server may be an Internet mail server such as Microsoft Exchange, or the like. The mail server may utilize facilities such as ASP™, ACTIVEX™, ANSI™ C++/C #, MICROSOFT®, .NET™, CGI SCRIPTS™, JAVA™ JAVASCRIPT™, PERL™ PHP™ PYTHON™, WEBOBJECTS™, etc. The mail server may utilize communication protocols such as Internet Message Access Protocol (IMAP), Messaging Application Programming Interface (MAPI), MICROSOFT® exchange, Post Office Protocol (POP), Simple Mail Transfer Protocol (SMTP), or the like. In some embodiments, the computer system 600 may implement a mail client stored program component. The mail client may be a mail viewing application, such as APPLE® MAIL™ MICROSOFT® ENTOURAGE™, MICROSOFT® OUTLOOK™, MOZILLA® THUNDERBIRD™, etc.

Furthermore, one or more computer-readable storage media may be utilized in implementing embodiments consistent with the present disclosure. A computer-readable storage medium may refer to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, e.g., be non-transitory. Examples include RAM, ROM, volatile memory, non-volatile memory, hard drives, Compact Disc ROMs (CD-ROMs), DVDs, flash drives, disks, and any other known physical storage media.

Various embodiments of the present disclosure provide numerous advantages. Embodiments of the present disclosure provide a method for dynamically replicating data in a disaggregated distributed storage system. The storage nodes in the storage pool 102 may be efficiently utilized as the selection of storage nodes for reading and writing are based on dynamic nature of the storage nodes. More specifically, replication parameters used to identify the storage node for replicating data may be not only based on available storage space in a storage node but also based on dynamic parameters, for example a flash factor of the storage node, and a latency between the controller and the storage node. Accordingly, placement of replicated data and recovery process of replicated data may be performed efficiently precluding the degradation of the storage nodes (e.g., flash memory). In addition, flash parameters, for example a wear level of the storage node and a type of storage node, may be considered to identify storage nodes which increase lifetime of flash devices used as storage nodes. Moreover, as the controller may have visibility to all storage nodes in the storage pool 102, reads may be served from any replicated copy in the DRG without a consistency issue.

It will be understood by those skilled in the art that, in general, terms used herein, and are generally intended as "open" terms (e.g., the term "including" should be interpreted as "including but not limited to," the term "having" should be interpreted as "having at least," the term "includes" should be interpreted as "includes but is not limited to," etc.). For example, as an aid to understanding, the detail description may contain usage of the introductory phrases "at least one" and "one or more" to introduce recitations. However, the use of such phrases should not be construed to imply that the introduction of a recitation by the indefinite articles "a" or "an" limits any particular part of description containing such introduced recitation to inventions containing only one such recitation, even when the introductory phrases "one or more" or "at least one" and indefinite articles such as "a" or "an" (e.g., "a" and/or "an"

should typically be interpreted to mean "at least one" or "one or more") are included in the recitations; the same holds true for the use of definite articles used to introduce such recitations. In addition, even if a specific part of the introduced description recitation is explicitly recited, those skilled in the art will recognize that such recitation should typically be interpreted to mean at least the recited number (e.g., the bare recitation of "two recitations," without other modifiers, typically means at least two recitations or two or more recitations).

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following detailed description

What is claimed is:

1. A method for dynamically replicating data in a disaggregated distributed storage system, the method comprising:
   receiving, by a processor, a request from a controller to replicate data;
   dynamically selecting, by the processor, a storage node for replicating the data from among a plurality of storage nodes, based on a plurality of first weight values corresponding to the plurality of storage nodes, wherein the plurality of first weight values are computed based on one or more replication parameters associated with each storage node of the plurality of storage nodes, and wherein the one or more replication parameters comprise at least one of a flash factor corresponding to the each storage node, and a latency between the controller and the each storage node; and
   providing, by the processor, information about the selected storage node to the controller for replicating the data.

2. The method as claimed in claim 1, wherein the plurality of storage nodes belong to a fault domain from among a plurality of fault domains.

3. The method as claimed in claim 1, wherein the selecting of the storage node comprises:
   computing, by the processor, the plurality of first weight values corresponding to the plurality of storage nodes based on the one or more replication parameters; and
   selecting, by the processor, the storage node from among the plurality of storage nodes based on the storage node having a highest first weight value from among the plurality of first weight values.

4. The method as claimed in claim 1, further comprising:
   identifying, by the processor, a set of fault domains from among a plurality of fault domains included in the disaggregated distributed storage system based on a fault domain tree and a replication rule, wherein the fault domain tree includes a topology of the disaggregated distributed storage system and a second weight value corresponding to each fault domain of the plurality of fault domains, wherein the topology comprises a plurality of nodes, and wherein the replication rule comprises at least a replication factor and a replication level; and
   creating, by the processor, a data replica group (DRG) based on identifying one storage node from each fault domain of the set of fault domains.

5. The method as claimed in claim 4, wherein each node of the plurality of nodes includes at least one storage node.

6. The method as claimed in claim 4, wherein the second weight value for the each fault domain is determined based on a first weight value associated with each storage node included in the each fault domain.

7. The method as claimed in claim 6, further comprising:
   updating, by the processor, the one or more replication parameters associated with the each storage node included in the DRG after creation of the DRG; and
   recomputing, by the processor, the first weight value for the each storage node included in the DRG based on the one or more updated replication parameters.

8. The method as claimed in claim 1, wherein the flash factor corresponding to the each storage node is determined based on one or more of a wear level of the each storage node and a type of the each storage node.

9. A method for reading data from a disaggregated distributed storage system, the method comprising:
   receiving, by a processor, a read request from at least one client device to read data, wherein the data is stored in a data replica group (DRG); and
   based on receiving the read request, selecting, by the processor, a storage node included in the DRG for serving the read request based on the storage node having a highest performance metric in the DRG, wherein the performance metric is computed based on one or more read parameters,
   wherein the one or more read parameters are determined in real-time,
   wherein the one or more read parameters comprise a latency between the processor and each storage node included in the DRG, a flash factor of the each storage node, and a load on the each storage node.

10. The method as claimed in claim 9, wherein the selecting of the storage node comprises:
    computing, by the processor, the performance metric for the each storage node included in the DRG based on the one or more read parameters; and
    identifying, by the processor, the storage node from the DRG having the highest performance metric.

11. The method as claimed in claim 9, wherein the data is moved to a new DRG based on a number of read request from the DRG being greater than a threshold value.

12. The method as claimed in claim 11, wherein the DRG is updated based on the data being moved to the new DRG.

13. A device for dynamically replicating data in a disaggregated distributed storage system, the device comprising:
    a memory configured to store instructions; and
    a processor configured to execute the instructions to:
      receive a request from a controller to replicate the data,
      dynamically select a storage node from among a plurality of storage nodes based on a plurality of first weight values corresponding to the plurality of storage nodes, wherein the plurality of first weight values are computed based on one or more replication parameters associated with each storage node of the plurality of storage nodes, wherein the one or more replication parameters comprise at least one of a flash factor corresponding to the each storage node, and a latency between the controller and the each storage node; and
      provide information about the selected storage node to the controller for replicating the data.

14. The device as claimed in claim 13, wherein to select the storage node, the processor is further configured to:
    compute a plurality of first weight values corresponding to the plurality of storage nodes based on the one or more replication parameters; and selecting the storage node from among the plurality of storage nodes based on the storage node having a highest first weight value from among the plurality of first weight values.

15. The device as claimed in claim 13, wherein the device is further caused to:
identify a set of fault domains from among a plurality of fault domains included in the disaggregated distributed storage system based on a fault domain tree and a replication rule, wherein the fault domain tree comprises a topology of the disaggregated distributed storage system and a second weight value corresponding to each fault domain of the plurality of fault domains, wherein the topology comprises a plurality of nodes, and wherein the replication rule comprises at least a replication factor and a replication level; and
create a data replica group (DRG) based on identifying one storage node from each fault domain of the set of fault domains.

16. The device as claimed in claim 15, wherein each node of the plurality of nodes comprises at least one storage node.

17. The device as claimed in claim 15, wherein the second weight value corresponding to the each fault domain is determined based on a first weight value associated with each storage node included in the each fault domain.

18. The device as claimed in claim 17, wherein the processor is further configured to:
update the one or more replication parameters associated with the each storage node included in the DRG after creation of the DRG; and
recompute the first weight value for the each storage node included in the DRG based on the one or more updated replication parameters.

19. The device as claimed in claim 13, wherein the flash factor corresponding to the each storage node is determined based on one or more of a wear level of the each storage node and a type of the each storage node.

20. A disaggregated distributed storage system, comprising:
a storage pool comprising a plurality of storage nodes; and
a controller pool comprising a plurality of controllers; and
a device configured to:
receive a request from a controller to replicate data,
based on receiving the read request, select a storage node from among the plurality of storage nodes based on a plurality of first weight values corresponding to the plurality of storage nodes, wherein the plurality of first weight values are computed based on one or more replication parameters associated with each storage node of the plurality of storage nodes; and
provide information about the selected storage node to the controller for replicating the data,
wherein the one or more replication parameters comprise at least one of a flash factor corresponding to the each storage node, and a latency between the controller and the each storage node.

21. The system of claim 20, wherein the device is further configured to:
receive a read request from at least one client device to read the data, wherein the data is stored in a data replica group (DRG); and
select a storage node included in the DRG for serving the read request based on one or more read parameters,
wherein the one or more read parameters are determined in real-time, and
wherein the one or more read parameters include a latency between the plurality of controllers and the each storage node included in the DRG, a flash factor of the each storage node, and a load on the each storage node.

* * * * *